(12) United States Patent
Hataida et al.

(10) Patent No.: US 6,442,665 B2
(45) Date of Patent: Aug. 27, 2002

(54) DATA PROCESSING DEVICE

(75) Inventors: Makoto Hataida; Toshiyuki Muta, both of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 36 days.

(21) Appl. No.: 09/753,563

(22) Filed: Jan. 4, 2001

(30) Foreign Application Priority Data

Jun. 26, 2000 (JP) ........................................ 2000-191406

(51) Int. Cl.$^7$ ................................................ G06F 12/00
(52) U.S. Cl. ........................ 711/203; 711/202; 711/205
(58) Field of Search ............................... 711/202, 203, 711/205, 206, 207, 128, 118

(56) References Cited

U.S. PATENT DOCUMENTS

| | | | | |
|---|---|---|---|---|
| 5,956,752 A | * | 9/1999 | Mathews | 711/204 |
| 6,138,226 A | * | 10/2000 | Yoshioka et al. | 711/210 |
| 6,157,986 A | * | 12/2000 | Witt | 711/118 |
| 6,360,314 B1 | * | 3/2002 | Webb, Jr. et al. | 712/219 |

FOREIGN PATENT DOCUMENTS

| | | |
|---|---|---|
| JP | 7-105094 | 4/1995 |
| JP | 8-6853 | 1/1996 |
| JP | 10-240618 | 9/1998 |

* cited by examiner

*Primary Examiner*—DoHyun Yoo
*Assistant Examiner*—Kimberly McLean
(74) *Attorney, Agent, or Firm*—Staas & Halsey LLP

(57) ABSTRACT

A calculating part performs calculation. A storing part stores data from the calculating part. An address converting part converts an address corresponding to data requested by the calculating part. A first comparing part compares an address from the address converting part and data stored in the storing part. A second comparing part compares the address corresponding to the data requested by the calculating part with an address of said storing part. A selecting part selects the data stored in the storing part to be provided to the calculating part when an address comparison result of the first comparing part is coincidence and also an address comparison result of the second comparing part is coincidence.

5 Claims, 7 Drawing Sheets

FIG.4

| VIRTUAL ADDRESS | PHYSICAL ADDRESS |
|---|---|
| VA1 | PA1 |
| VA2 | PA2 |
| ⋮ | ⋮ |
| VAn | PAn |

FIG.5

| VIRTUAL ADDRESS | PHYSICAL ADDRESS | STB DATA |
|---|---|---|
| VA1 | PA1 | STB−D1 |
| VA2 | PA2 | STB−D2 |
| ⋮ | ⋮ | ⋮ |
| VAn | PAn | STB−Dn |

FIG.7

| PRDMCH | TAGMCH | STBMCH | STATE RESPONSE | SELECTED DATA |
|---|---|---|---|---|
| 1 | 1 | 1 | VALID | STB DATA |
| | | 0 | | RAM DATA |
| | 0 | 1 | | STB DATA |
| | | 0 | MISS | |
| 0 | — | — | RETRY | — |

DATA PROCESSING DEVICE

BACKGROUND OF THE INVENTION

1. Field of the Invention

The present invention relates to a data processing device, in particular, to a data processing device having a cache unit.

2. Description of the Related Art

Generally speaking, a data processing device such as a CPU in the related art has a cache memory built therein. Normally, a cache memory built in a CPU includes a primary cache, a store buffer and a reload buffer. Further, a secondary cache may be connected thereto externally.

For a CPU having such a cache memory built therein, a system, called a non-blocking cache, is employed for securing a bandwidth of accessing. The non-blocking cache system. is a system such that data can be bypassed to a CPU core from any of a primary cache, a store buffer and a reload buffer.

At this time, it is necessary to determine whether the primary cache, store buffer or reload buffer stores data required by the CPU core therein, and to select the data.

In the related art, when data is to be selected, all the bits of the virtual address provided from the CPU core are compared with all the bits of the virtual addresses or physical addresses of the primary cache, store buffer and reload buffer. Then, it is determined whether or not they coincide. Then, the data is provided from one, for which the bits coincide, to the CPU core.

However, in the related art, all the bits of the physical address of data are used for the comparison, and the data from the primary cache or store buffer is selected according to the result of the comparison. Accordingly, it is necessary to convert all the bits of the virtual address provided by the CPU core into a physical address. Therefore, a delay required for obtaining the required data is long, and, thereby, high-speed data processing in the device cannot be achieved.

SUMMARY OF THE INVENTION

The present invention has been devised in consideration of the above-mentioned matter, and an object of the present invention is to provide a data processing device by which it is possible to shorten a time required for obtaining the required data.

A data processing device according to the present invention, comprises:

a calculating part performing calculation;

a storing part storing data from the calculating part;

an address converting part converting an address, corresponding to requested data, provided by the calculating part;

a first comparing part comparing an address from the address converting part with an address in the storing part;

a second comparing part comparing the address, corresponding to the requested data, provided by the calculating part with an address in the storing part; and a selecting part selecting the data stored in the storing part as that to be provided to the calculating part when the address comparison result of the first comparing part is coincidence and also the address comparison result of the second comparing part is coincidence.

Thereby, by combining the comparison result of the first comparing part with the comparison result of the second comparing part, it s possible to select the data stored in the storing part without performing strict address comparison. Thereby, it is not necessary to use all the bits of the address provided by the calculating part for comparison, and to provide the data to the calculating part at high speed.

Further, because it is possible to recognize from the comparison result of the second comparing part whether or not the requested data requested by the calculating part is stored in the storing part, it is possible to report to the calculating part whether or not the requested data is stored in the storing part instantaneously (because the second comparing part uses the address directly provided by the calculating part).

The calculating part may output a virtual address of data which it requests;

the address converting part may convert the virtual address from the calculating part into a physical address;

the first comparing part may compare the physical address from the address converting part with a physical address in the storing part; and the second comparing part may compare part of the virtual address from the calculating part with part of a virtual address in the storing part.

Thereby, it is possible to perform bypassing of data from the cache (storing part) to the calculating part at high speed in a VIPT (Virtual Index Physical Tag) method.

The storing part may temporarily store a calculation result of the calculating part before it is stored in another storing part. Thus, the storing part acts as a so-called store buffer.

Thereby, it is possible to perform bypassing from the store buffer to the calculating part at high speed.

The storing part may temporarily store data from an external storage device such as a main storage device or a secondary cache, thus, act as a so-called reload buffer.

Thereby, it is possible to perform bypassing from the reload buffer to the calculating part at high speed.

Other objects and further features of the present invention will become more apparent from the following detailed description when read in conjunction with the accompanying drawings.

BRIEF DESCRIPTION OF THE DRAWINGS

FIG. 4 shows a data configuration of an address conversion table shown in FIG. 3A;

FIG. 5 shows a data configuration of a store buffer shown in FIG. 3A;

FIG. 7 shows relationship between a tag-coincidence signal TAGMCH, an all-coincidence signal PRDMCH and a partial-coincidence signal STBMCH, and state responses VALID, MISS and RETRY.

DETAILED DESCRIPTION OF THE PREFERRED EMBODIMENT

Figure 1:
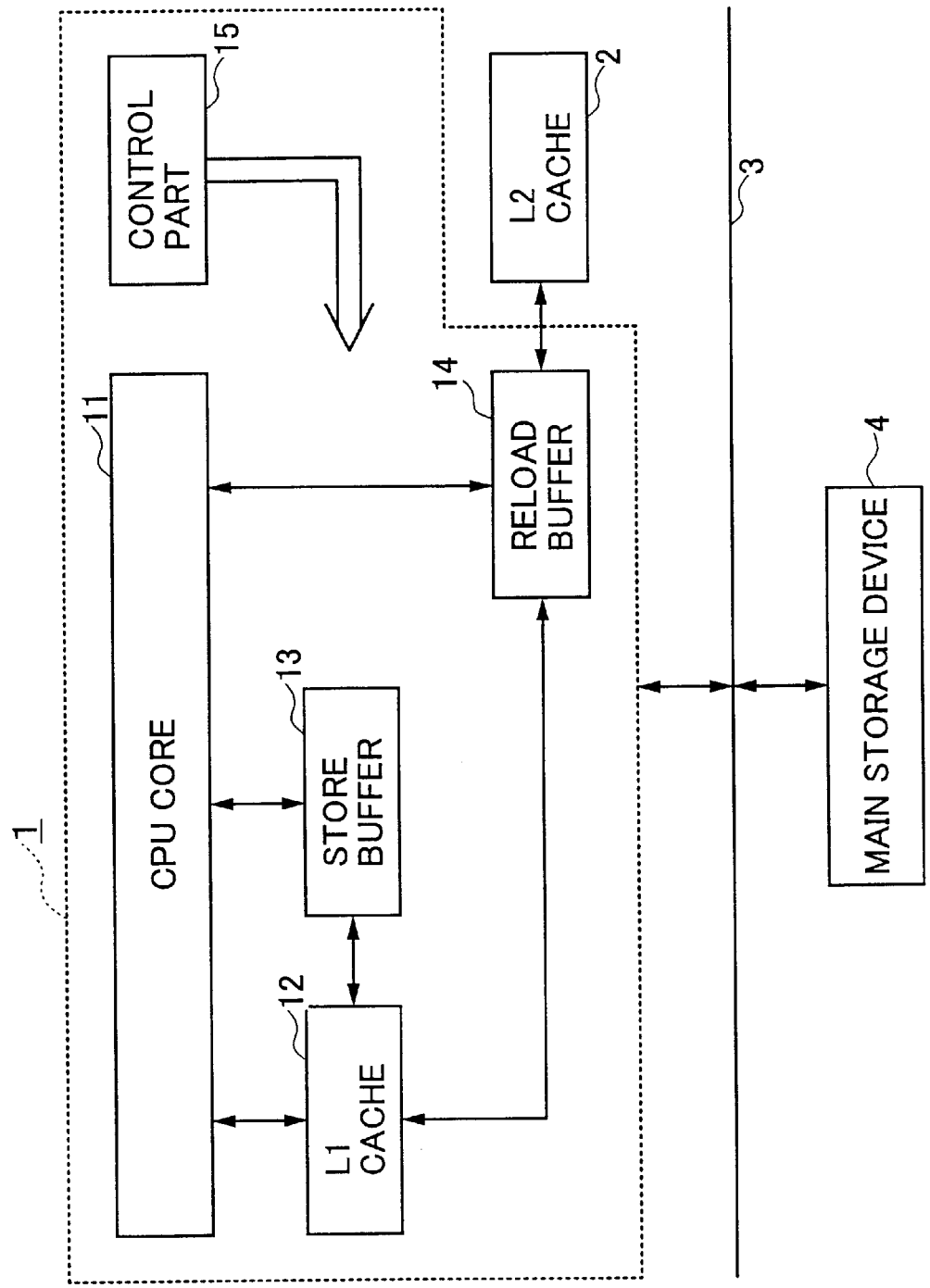
FIG. 1 shows a block diagram of one embodiment of the present invention.

FIG. 1 shows a block diagram of an embodiment of the present invention.

A data processing device 1 in the embodiment of the present invention has, as shown in FIG. 1, a secondary cache connected thereto, and, also, is connected to a main storage device 4 via a system bus 3.

The data processing device 1 includes a CPU core 11, a primary cache 12, a store buffer 13, a reload buffer 14 and a control part 15. The CPU core 11 performs calculations according to given instructions. The primary cache 12 stores therein data used in calculations by the CPU core 11 and the calculation results thereof. The store buffer 13 is provided between the CPU core 11 and primary cache 12, and temporarily stores therein the calculation results from the CPU core 11.

The reload buffer 14 is provided between the primary cache 12 and secondary cache 2, and temporarily stores therein data provided by the secondary cache 2. The control part 15 selects data stored in the secondary cache 2, primary cache 12, store buffer 13 and reload buffer 14.

Figure 2:
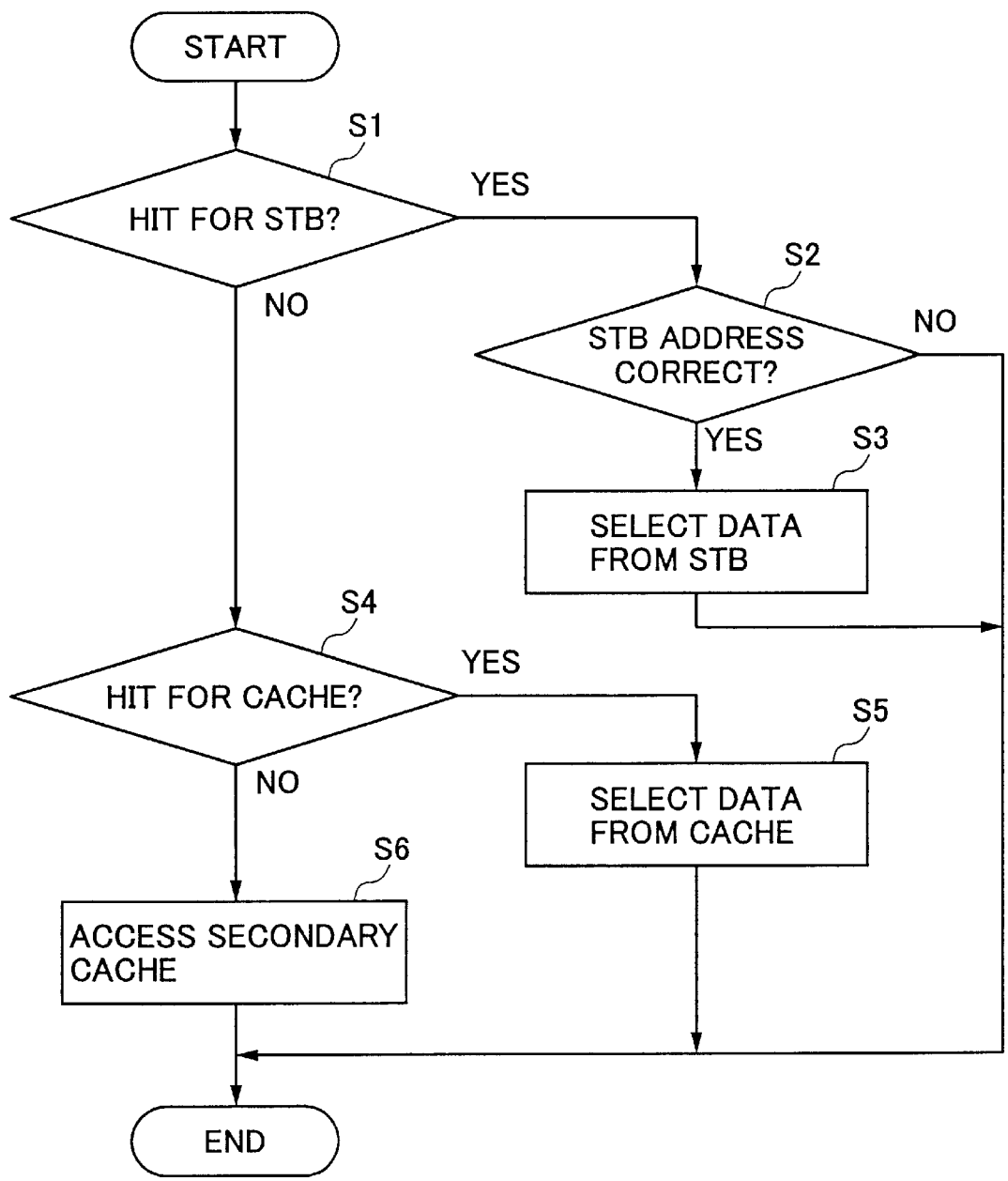
FIG. 2 shows a control flow chart of a control part shown in FIG. 1 at a time of data selection.

FIG. 2 shows a flow chart of control performed by the control part 15 at a time of selecting data in the embodiment of the present invention.

The control part 15 executes steps S1 through S6, which will now be described, at the time of selecting data. The step S1 is a step for determining whether a hit has been made for the store buffer 13. Specifically, in the step S1, the virtual address VA provided by the CPU core 11 is compared with the virtual address VA stored in the store buffer 13. Then, when the virtual address corresponding to the virtual address VA from the CPU core 11 exists in the store buffer 13, it is determined that a hit has been made for the store buffer 13.

When it is determined in the step S1 that a hit has been made, the step S2 is executed. The step S2 is a step for determining whether or not the physical address corresponding to the required data is correct.

When the physical address corresponding to the required data exists in the store buffer 13 in the step S2, that is, the physical address corresponding to the required data is correct, and, therefore, the step S3 is executed. The step S3 is a step for selecting the data stored in the store buffer 13.

When it is determined in the step S1 that no hit has been made, the step S4 is executed. The step S4 is a step for determining whether or not a hit has been made for the primary cache 12. When it is determined in the step S4 that a hit has been made for the primary cache 12, the step S5 is executed. The step S5 is a step for selecting data from the primary cache 12.

When it is determined in the step S4 that no hit has been made for the primary cache 12, the step S6 is executed. The step S6 is a step for accessing the secondary cache 2 or main storage device 4 and obtaining data therefrom.

Figure 3A:
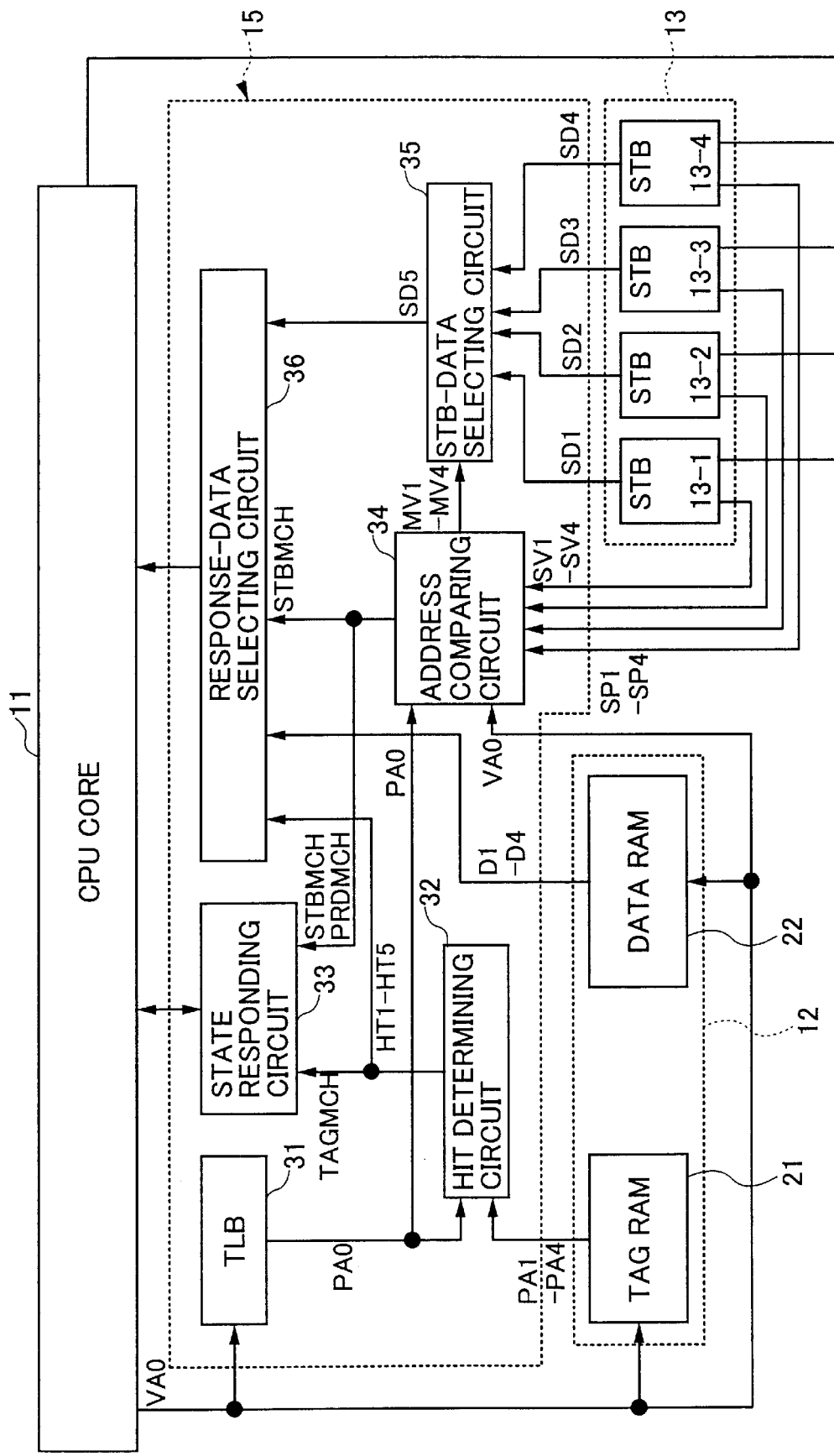
FIG. 3A shows a block diagram of the embodiment shown in FIG. 1, partially in detail.

A configuration for achieving the above-described control will now be described in detail with reference to FIG. 3A.

The primary cache 12 includes a tag RAM 21 and a data RAM 22, and has a configuration of 512 entries×4 ways in a 4-WAY set associative system. The tag RAM 21 has a virtual address of nine bits B6 through B14 provided thereto out of a virtual address of 64 bits B0 through B64 provided by the CPU core 11, and, by using the thus-provided virtual address, searches for a physical address of 29 bits B13 through B41 out of a physical address of 42 bits B0 through B41, and outputs the thus-searched-for physical address.

The data RAM 22 has a data width of 16 bytes, and searches for data of 128 bits by using a virtual address of 11 bits B4 through B14 out of the virtual address of 64 bits B0 through B63 provided by the CPU core 11, and outputs the thus-searched-for data.

The store buffer 13 includes four buffer memories 13-1 through 13-4, and, in each of the buffer memories 13-1 through 13-4, the virtual address of 11 bits B4 through B14 out of the virtual address of 64 bits B0 through B63, the physical address of 29 bits B13 through B41 out of the physical address of 42 bits B0 through B41, and write data of 128 bits B0 through B127 are stored temporarily.

The control part 15 includes an address conversion table 31, a hit determining circuit 32, a state responding circuit 33, an address comparing circuit 34, a store-buffer (STB)-data selecting circuit 35 and a response-data selecting circuit 36.

FIG. 4 shows a data configuration of the address conversion table 31.

The address conversion table 31 has, as shown in FIG. 4, correspondences between virtual addresses VA1 through VAn and physical addresses PA1 through PAn stored therein.

The virtual address VA from the CPU core 11 has a bit width of 64 bits B0 through B63. Further, the physical address PA has a bit width of 42 bits B0 through B41. The address conversion table 31 has the bits B13 through B63 provided thereto out of the virtual address of 64 bits B0 through B63 provided by the CPU core 11, and outputs the physical address PA of bits B13 through B41.

The physical address PA output from the address conversion table 31 is provided to the hit determining circuit 32 and address comparing circuit 34. The hit determining circuit 32 compares the physical address PA output from the tag RAM 21 with the physical address PA provided from the address conversion table 31, and determines whether or not they coincide.

The determination result of the hit determining circuit 32 is provided to the state responding circuit 33 and response-data selecting circuit 36. The state responding circuit 33 determines the state of the required data based on the determination result of the hit determining circuit 32 and the comparison result of the address comparing circuit 34.

The address comparing circuit 34 compares the virtual address VA from the CPU core 11 with the virtual address VA stored in each of the buffer memories 13-1 through 13-4 of the store buffer 13, and determines whether or not they coincide, and, also, compares the physical address PA from the address conversion table 31 with the physical address PA stored in each of the buffer memories 13-1 through 13-4 of the store buffer 13, and determines whether or not they coincide.

A data configuration of each of the buffer memories 13-1 through 13-4 of the store buffer 13 will now be described.

FIG. 5 shows the data configuration of the buffer memories 13-1 through 13-4 of the store buffer 13.

As shown in FIG. 5, in the buffer memories 13-1 through 13-4 of the store buffer 13, the virtual addresses VA1 through VAn (in this embodiment, VA1 through VA4 corresponding to the buffer memories 13-1 through 13-4, respectively) and physical addresses PA1 through PAn (in this embodiment, PA1 through PA4 corresponding to the buffer memories 13-1 through 13-4, respectively) corresponding to STB data STB-D1 through STB-Dn (in this embodiment, STB-D1 through STB-D4 corresponding to the buffer memories 13-1 through 13-4, respectively) stored in the buffer memories 13-1 through 13-4 are stored.

There, the virtual address VA includes bits B4 through B14 out of bits B0 through B63. Further, the physical address PA includes bits B13 through B41 out of bits B0 through B63. Further, STB data STB-D includes all the bits B0 through B127.

The address comparing circuit 34 will now be described in detail.

Figure 6:
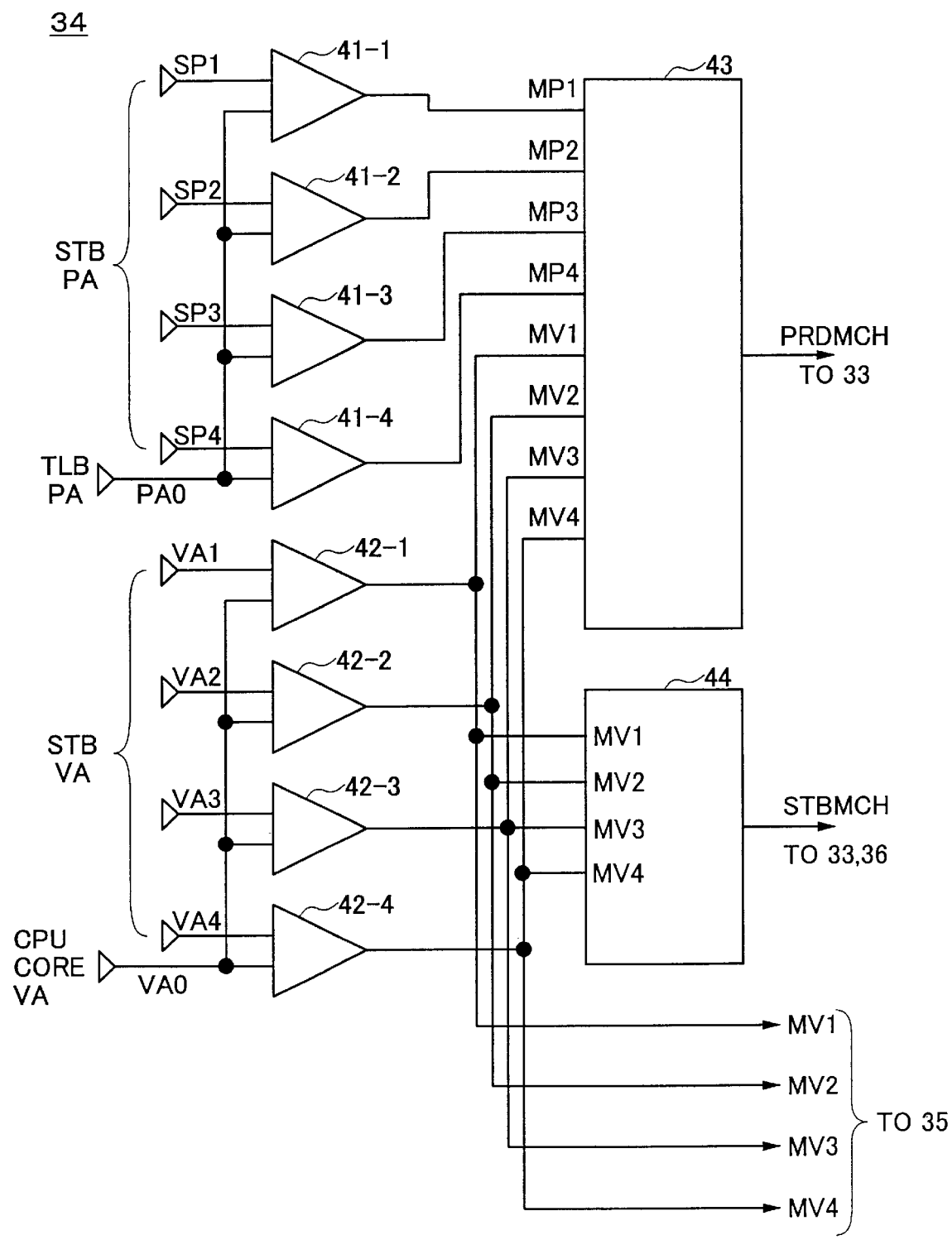
FIG. 6 shows a circuit diagram of an address comparing circuit shown in FIG. 3A.

FIG. 6 shows a block diagram of the address comparing circuit 34.

The address comparing circuit 34 includes, as shown in FIG. 6, address comparators 41-1 through 41-4, address comparators 42-1 through 42-4, and logical circuits 43, 44. The address comparator 41-1 compares the physical address PA from the address conversion table 31 with the physical address PA1 of the buffer memory 13-1 of the store buffer 13. When the physical address PA from the address conversion table 31 coincides with the physical address PA1 of the buffer memory 13-1 of the store buffer 13, the address comparator 41-1 outputs '1'. When they do not coincide, the address comparator 41-1 outputs '0'.

The address comparator 41-2 compares the physical address PA from the address conversion table 31 with the physical address PA2 of the buffer memory 13-2 of the store buffer 13. When the physical address PA from the address conversion table 31 coincides with the physical address PA2 of the buffer memory 13-2 of the store buffer 13, the address comparator 41-2 outputs '1'. When they do not coincide, the address comparator 41-2 outputs '0'.

The address comparator 41-3 compares the physical address PA from the address conversion table 31 with the physical address PA3 of the buffer memory 13-3 of the store buffer 13. When the physical address PA from the address conversion table 31 coincides with the physical address PA3 of the buffer memory 13-3 of the store buffer 13, the address comparator 41-3 outputs '1'. When they do not coincide, the address comparator 41-3 outputs '0'.

The address comparator 41-4 compares the physical address PA from the address conversion table 31 with the physical address PA4 of the buffer memory 13-4 of the store buffer 13. When the physical address PA from the address conversion table 31 coincides with the physical address PA4 of the buffer memory 13-4 of the store buffer 13, the address comparator 41-4 outputs '1'. When they do not coincide, the address comparator 41-4 outputs '0'.

The outputs from the address comparators 41-1 through 41-4 are provided to the logical circuit 43. The logical circuit 43 outputs an all-coincidence signal PRDMCH, which will be described later, calculated from the outputs of the address comparators 41-1 through 41-4. The thus-output all-coincidence signal PRDMCH is provided to the state responding circuit 33.

The address comparator 42-1 compares the virtual address VA from the CPU core 11 with the virtual address VA1 of the buffer memory 13-1 of the store buffer 13. When the virtual address VA from the CPU core 11 coincides with the virtual address VA1 of the buffer memory 13-1 of the store buffer 13, the address comparator 42-1 outputs '1'. When they do not coincide, the address comparator 42-1 outputs '0'.

The address comparator 42-2 compares the virtual address VA from the CPU core 11 with the virtual address VA2 of the buffer memory 13-2 of the store buffer 13. When the virtual address VA from the CPU core 11 coincides with the virtual address VA2 of the buffer memory 13-2 of the store buffer 13, the address comparator 42-2 outputs '1'. When they do not coincide, the address comparator 42-2 outputs '0'.

The address comparator 42-3 compares the virtual address VA from the CPU core 11 with the virtual address VA3 of the buffer memory 13-3 of the store buffer 13. When the virtual address VA from the CPU core 11 coincides with the virtual address VA3 of the buffer memory 13-3 of the store buffer 13, the address comparator 42-3 outputs '1'. When they do not coincide, the address comparator 42-3 outputs '0'.

The address comparator 42-4 compares the virtual address VA from the CPU core 11 with the virtual address VA4 of the buffer memory 13-4 of the store buffer 13. When the virtual address VA from the CPU core 11 coincides with the virtual address VA4 of the buffer memory 13-4 of the store buffer 13, the address comparator 42-4 outputs '1'. When they do not coincide, the address comparator 42-4 outputs '0'.

The outputs from the address comparators 42-1 through 42-4 are provided to the logical circuit 44. The logical circuit 44 outputs a partial-coincidence signal STBMCH, which will be described later, calculated from the outputs of the address comparators 42-1 through 42-4. The thus-output partial-coincidence signal STBMCH is provided to the state responding circuit 33 and response-data selecting circuit 36. The respective outputs of the address comparators 42-1 through 42-4 are provided to the STB-data selecting circuit 35.

The response-data selecting circuit 36, based on the outputs from the logical circuit 44 and the hit determining circuit 32, selects either the data from the data RAM 22 or the data from the store buffer 13, and provides the thus-selected data to the CPU core 11.

Operations of the embodiment of the present invention will now be described.

When a read request is given by the CPU core 11, the address conversion table 31 converts the virtual address VA0 of the requested data into the physical address PA0. Further, by using the virtual address VA0 from the CPU core 11, the tag RAM 21 and data ROM 22 are searched, and thereby, the physical address PA1 through PA4 and data D1 through D4 corresponding to the request are obtained therefrom.

Because the above-mentioned search is performed by using the bits of each address only partially as mentioned above, the four address PA1 through PA4 are obtained from the single address VA0.

The hit determining circuit 32 compares the physical address PA0 from the address conversion table 31 and each of the physical addresses PA1 through PA4 from the tag RAM 21 with one another. Thus, the hit determining circuit 32 compares the physical address PA0 with each of PA1 through PA4, and, then, outputs hit signals HT1 through HT4, respectively. Further, also a tag coincidence signal TAGMCH indicating that at least one WAY made a hit is generated. The logical value of the tag coincidence signal TAGMCH is determined by the following logical formula:

$$TAGMCH = HT1 + HT2 + HT3 + HT4$$

Further, the address comparing circuit 34 compares the virtual address VA0 with each of the virtual addresses SV1 through SV4 stored in the store buffer 13, and obtains the comparison results MV1 through MV4, respectively.

Further, the address comparing circuit 34 compares the physical address PA1 with each of the physical addresses SP1 through SP4 stored in the store buffer 13, and obtains the comparison results MP1 through MP4, respectively.

Further, the address comparing circuit 34 compares the comparison results MV1 through MV4 with the comparison results MP1 through MP4, respectively, and, outputs the above-mentioned all-coincidence signal PRDMCH having the value '1' when all the four comparison results coincide with the corresponding ones, respectively, and the above-mentioned partial-coincidence signal STBMCH having the value '1' when at least one of the four virtual addresses SV1 through SV4 of the store buffer 13 coincides with the virtual address VA0. The logical values of the all-coincidence signal PRDMCH and partial-coincidence signal STBMCH are determined by the following logical formulas:

$$PRDMCH=/(MV1 \oplus MP1) \cdot /(MV2 \oplus MP2) \cdot /(MV3 \oplus MP3) \cdot /(MV4 \oplus MP4)$$

$$STBMCH=MV1+MV2+MV3+MV4$$

(In the logic formulas through the specification, the symbol '/' means the logical NOT operation; '+' means the logical sum (OR) operation; '·' means the logical product (AND) operation; and '⊕' means the logical exclusive-OR (XOR) operation.)

The store-buffer-data selecting circuit 35 selects data SD5 to be sent to the response-data selecting circuit 36 from the data SD1, SD2, SD3 and SD4 stored in the respective buffer memories 13-1 through 13-4 of the store buffer 13, using the comparison results MV1, MV2, MV3 and MV4. The data SD5 is determined by the following logical formula:

$$SD5=SD1 \cdot MV1+SD2 \cdot MV2+SD3 \cdot MV3+SD4 \cdot MV4$$

The response-data selecting circuit 36 selects data D5 to be sent, as a response, to the CPU core 11, from the respective data D1 through D4 and SD5, by using the hit signals HT1 through HT4 and partial-coincidence signal STBMCH. The data D5 is determined from the following logical formula:

$$D5=(D1 \cdot HT1+D2 \cdot HT2+D3 \cdot HT3+D4 \cdot HT4) \cdot /STBMCH+SD5 \cdot STBMCH$$

The state-responding circuit 33 generates state responses VALID, MISS and RETRY, by using the above-mentioned tag-coincidence signal TAGMCH, all-coincidence signal PRDMCH and partial-coincidence signal STBMCH. The state response VALID indicates a state such that the requested data can be normally sent as a response, the state response MISS indicate a state such that the requested data does not exist in any of the data RAM 22 and store buffer 13, and the state response RETRY indicates a state such that re-execution of the same request is needed.

The state responses VALID, MISS and RETRY are determined by the following logical formulas:

$$VALID=(TAGMCH+STBMCH) \cdot PRDMCH$$

$$MISS=/(TAGMCH+STBMCH) \cdot PRDMCH \quad RETRY=/PRDMCH$$

FIG. 7 shows relationship between the tag-coincidence signal TAGMCH, all-coincidence signal PRDMCH and partial-coincidence signal STBMCH, and the state responses VALID, MISS and RETRY.

When the all-coincidence signal PRDMCH: '1' (that means a state in which the STB address is correct, and, thus, corresponds to YES in the step S2 shown in FIG. 2), tag-coincidence signal TAGMCH: '1' (that means a state in which a hit has been made for the cache, and, thus, corresponds to YES in the step S4) and partial-coincidence signal STBMCH: '1' (that means a state in which a hit has been made for the STB, and, thus, corresponds to YES in the step S1), the state response VALID is obtained, and the STB data stored in the store buffer 13 is provided to the CPU core 11 (that corresponds to the step S3). When the all-coincidence signal PRDMCH: '1', tag-coincidence signal TAGMCH: '1' and partial-coincidence signal STBMCH: '0', the state response VALID is also obtained, and the RAM data stored in the data RAM 22 is provided to the CPU core 11 (that corresponds to the step S5). When the all-coincidence signal PRDMCH: '1', tag-coincidence signal TAGMCH: '0' and partial-coincidence signal STBMCH: '1', the state response VALID is also obtained, and the STB data stored in the store buffer 13 is provided to the CPU core 11 (that also corresponds to the step S3).

When the all-coincidence signal PRDMCH: '1', tag-coincidence signal TAGMCH: '0' and partial-coincidence signal STBMCH: '0', the state response MISS is obtained, and no data is provided to the CPU core 11 from the response-data selecting circuit 36, and the secondary cache 2 is accessed (that corresponds to the step S6). When the all-coincidence signal PRDMCH: '0', the state response RETRY is obtained, and no data is provided to the CPU core 11 from the response-data selecting circuit 36 (that means a state resulting from NO of the step S2).

At this time according to the present embodiment, by checking partial coincidence of the physical address PA and virtual address VA, it is possible to provide the data stored in the data RAM 22 or store buffer 13 selectively to the CPU core 11. Accordingly, it is possible to reduce a time required for the comparison, in comparison to a case where all the bits of the physical addresses are used for the comparison, and to provide the required data to the CPU core 11 at high speed.

Further, it is not necessary to convert the virtual address VA into the physical address PA because only the virtual address VA is used for the comparison or search of the tag RAM 21, data RAM 22 and address comparing circuit 34. Accordingly, it is possible to search for the requested data at high speed. Furthermore, by providing the comparison result of the virtual address VA to the CPU core 11 from the state responding circuit 33, the CPU core 11 can provide re-requesting instructions rapidly based on the thus-provided comparison result.

Figure 3B:
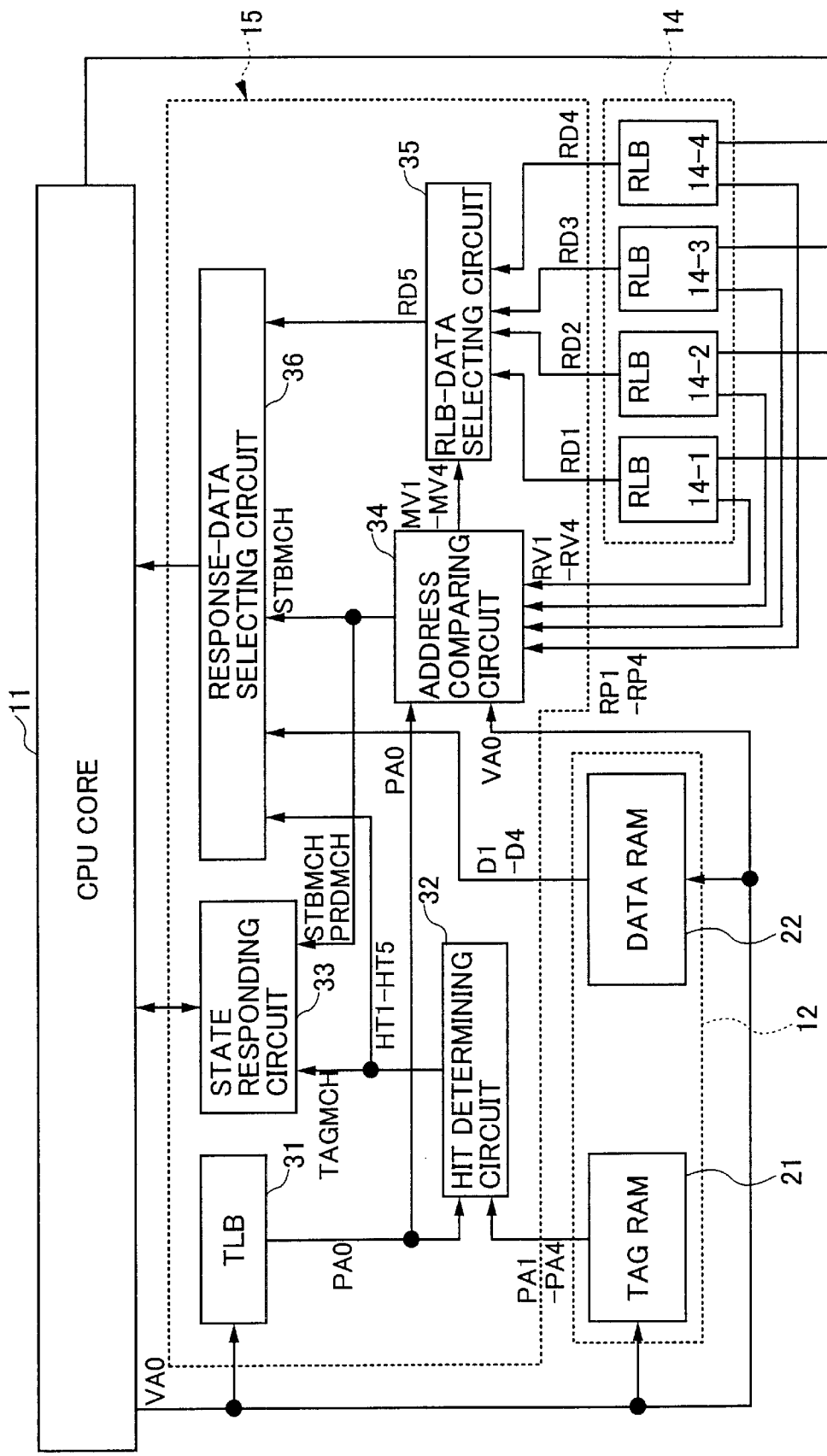
FIG. 3B shows a block diagram of a variant embodiment of the embodiment shown in FIG. 1, partially in detail.

In the present embodiment, the above-described determination and selection are performed between the primary cache 12 and store buffer 13. However, it is also possible that the same control is performed between the primary cache 12 and reload buffer 14 or between the reload buffer 14 and secondary cache 2. FIG. 3B shows a variant embodiment in which the same determination and selection is performed between the primary cache 12 and reload buffer 14.

Further, in the tag RAM 21, the physical address PA is held, and the physical address PA is searched for by using the virtual address VA provided from the CPU core 11, that is a so-called VIPT (Virtual Index Physical Tag) method. However, it is also possible to employ a so-called VIVT (Virtual Index Virtual Tag) method such that the virtual address VA is held in the tag RAM 21, and the virtual address VA is searched for by using the virtual address VA provided by the CPU core 11. Alternatively, it is also possible to employ a so-called PIPT (Physical Index Physical Tag) method such that the physical address PA is searched for by using the physical address PA.

The present invention is not limited to the above-described embodiments, and variations and modifications may be made without departing from the scope of the present invention.

The present application is based on Japanese priority applications Nos. 2000-191406 filed on Jun. 26, 2000, the entire contents of which are hereby incorporated by reference.

What is claimed is:

1. A data processing device, comprising:
 a calculating part performing calculation;
 a storing part storing data from said calculating part;
 an address converting part converting an address, corresponding to requested data, provided by said calculating part;

a first comparing part comparing an address from said address converting part with an address in said storing part;

a second comparing part comparing the address, corresponding to the requested data, provided by said calculating part with an address in said storing part; and a selecting part selecting the data stored said storing part as that to be provided to said calculating part when an address comparison result of said first comparing part indicates a match and also an address comparison result of said second comparing part indicates a match.

2. The data processing device as claimed in claim 1, wherein said second comparing part uses only part of the address for comparison.

3. The data processing device as claimed in claim 1, wherein:

said calculating part outputs a virtual address of data which it requests;

said address converting part converts the virtual address from said calculating part into a physical address;

said first comparing part compares the physical address from said address converting part with a physical address in said storing part; and said second comparing part compares part of the virtual address from said calculating part with part of the virtual address in said storing part.

4. The data processing device as claimed in claim 1, wherein said storing part temporarily stores a calculation result of said calculating part before it is stored in another storing part.

5. The data processing device as claimed in claim 1, wherein said storing part temporarily stores data from an external storage device.

* * * * *

UNITED STATES PATENT AND TRADEMARK OFFICE
CERTIFICATE OF CORRECTION

PATENT NO. : 6,442,665 B2　　　　　　　　　　　　　　　　　　　　　　Page 1 of 1
DATED : August 27, 2002
INVENTOR(S) : Makoto Hataida et al.

It is certified that error appears in the above-identified patent and that said Letters Patent is hereby corrected as shown below:

<u>Column 9,</u>
Line 7, after "stored" insert -- in --.

Signed and Sealed this

Twenty-fourth Day of December, 2002

JAMES E. ROGAN
*Director of the United States Patent and Trademark Office*